United States Patent [19]

Mathews

[11] Patent Number: 5,498,362
[45] Date of Patent: Mar. 12, 1996

[54] PROCESS FOR THE PRODUCTION OF ROAD DEICERS FROM WATER PLANT RESIDUALS

[75] Inventor: Alexander P. Mathews, Manhattan, Kans.

[73] Assignee: Kansas State University Research Foundation, Manhattan, Kans.

[21] Appl. No.: 407,678

[22] Filed: Mar. 21, 1995

[51] Int. Cl.$^6$ .................................................. C09K 3/18
[52] U.S. Cl. .................. 252/70; 106/13; 423/159; 423/173; 423/636; 423/637
[58] Field of Search ............... 106/13; 252/70; 562/607, 608; 423/159, 173, 636, 637

[56] References Cited

U.S. PATENT DOCUMENTS

| | | | |
|---|---|---|---|
| 4,377,488 | 3/1983 | Gancy | 106/13 |
| 4,389,323 | 6/1983 | Gancy | 106/13 |
| 4,606,836 | 8/1986 | Gancy | 106/13 |
| 4,636,467 | 1/1987 | Chynoweth | 435/140 |
| 4,699,725 | 10/1987 | Gancy | 106/13 |
| 4,855,071 | 8/1989 | Todd, Jr. et al. | 252/70 |
| 4,913,831 | 4/1990 | Todd, Jr. et al. | 252/70 |
| 5,132,035 | 7/1992 | Hoenke et al. | 106/13 |
| 5,219,483 | 6/1993 | Rynbrandt et al. | 106/13 |
| 5,324,442 | 6/1994 | Mathews | 252/70 |

OTHER PUBLICATIONS

Fritzsche, Calcium Magnesium Acetate Deicer, Water Environment & Technology, Jan., 1992; pp. 44–51.
Harrach et al.; Fine Tuning CMA for Corrosion Control; Public Works for Jul., 1990, pp. 40–41.
Fritzsche, CMA In Winter Maintenance, Public Works for Jul., 1989, pp. 78–79.
The Manhattan Mercury, Scientists Seek Salt Substitute, B8, Wednesday, Jan. 9, 1991.

*Primary Examiner*—Anthony Green
*Attorney, Agent, or Firm*—Hovey, Williams, Timmons & Collins

[57] ABSTRACT

An improved process for the production of road deicer products preferably containing calcium magnesium acetate or calcium magnesium acetate/calcium magnesium propionate is provided. The process involves first providing a residual water plant sludge starting material containing calcium and magnesium compounds, and reacting this sludge with stoichiometric quantities of at least acetic acid and more preferably both acetic and propionic acids. The resultant reaction product can then be dried, ground and granulated to provide a dry, free flowing road deicer product.

9 Claims, No Drawings

PROCESS FOR THE PRODUCTION OF ROAD DEICERS FROM WATER PLANT RESIDUALS

BACKGROUND OF THE INVENTION

1. Field of the Invention

The present invention is broadly concerned with an improved, low-cost process for the production of road deicers making use of water plant residuals typically containing calcium and magnesium compounds. More particularly, the invention pertains to such a method wherein the water plant residuals are initially concentrated and reacted with organic acids such as acetic acid to yield calcium acetate, calcium magnesium acetate (CMA) or a mixture of such acids such as acetic and propionic acids to give a calcium magnesium acetate/calcium magnesium propionate (CMA/CMP) deicer.

2. Description of the Prior Art

The importance of the effectiveness removal of snow and ice from roadways during winter can not be overemphasized in terms of reducing traffic accidents and fatalities. Approximately ten million metric tons of salts, principally sodium chloride and some calcium chloride, are used annually on roadways in the United States for this purpose. While these salts are inexpensive and effective deicers, there are numerous harmful effects attendant to their use. These include the accelerated corrosion of automobiles, degradation of structural and reinforcing steel, damage to roadside vegetation, and harm to drinking water supplies. Among the various alternative compounds heretofore proposed as substitute deicers, calcium magnesium acetate (CMA) has emerged as the leading candidate, based on its effectiveness in deicing and reducing corrosion rates and environmental effects. However, the cost of this product is approximately twenty times or more than that of rock salt. Therefore, the use of CMA by various local and state governmental agencies has been quite minimal owing to cost considerations.

U.S. Pat. No. 4,855,071 describes a slurry process for preparing CMA wherein alkaline earth or alkali metal carboxylates are formed and the slurry is heated and distributed as a thin layer on substrate particles. The basic raw materials suggested for such CMA production are dolomitic lime and glacial acetic acid. Similarly, U.S. Pat. No. 4,636,467 suggests use of dolomitic lime with acetic acid for the production of CMA.

A principal drawback to the widespread use of CMA and similar road deicers is the cost thereof. While dolomite is relatively inexpensive, the overall cost of synthetic road deicers could be substantially lowered if still less expensive starting materials could be employed.

It is known that residuals (sludge) from water softening plants contain calcium and magnesium salts as well as inorganic and organic impurities. The amount of precipitates such as ferric or aluminum hydroxide in the sludge can be virtually negligible if the plant has primary and secondary clarifiers and lime sludge is withdrawn from the primary basin. The amounts of inorganic constituents such as clay and organic compounds will depend on the raw water characteristics. In most cases, these amounts of impurities will be quite small for ground waters; for surface waters, these impurities may also be present only in small quantities if presedimentation basins are used. In most cases, therefore, the main constituents of water plant sludge from softening plants will be calcium carbonate, calcium hydroxide and magnesium oxide, although other impurities will almost always be present in greater or lesser amounts.

Of course, water plant sludges have almost no economic value and indeed can present a disposal problem in their own right. Therefore, any economically viable use of such sludges would represent a distinct breakthrough in the art.

SUMMARY OF THE INVENTION

The present invention overcomes the problems outlined above, and provides a new and inexpensive process for the production of road deicers containing calcium acetate, CMA or more preferably a mixture of CMA and CMP. The invention represents an improvement over the processes described in U.S. Pat. No. 5,324,442 which is incorporated by reference herein.

Broadly speaking, the invention relates to the discovery that efficient road deicer products can be manufactured using water plant residual sludges as a starting material containing at least the desired calcium ions, and usually magnesium ions as well. This represents a distinct advantage over other processes in that a very inexpensive starting material is employed which would otherwise be a burden on the environment.

In more detail, the process of the invention involves first providing a quantity of water plant residual sludge which contains at least about 50% by weight on a dry basis of a mixture having compounds selected from the group consisting of calcium carbonate, calcium hydroxide, magnesium hydroxide and mixtures thereof; preferably the mixture has respective amounts of at least calcium carbonate and calcium hydroxide (and usually magnesium hydroxide) therein. If the sludge contains less than the desired amount of calcium and magnesium compounds, supplemental additions may be made in the form of dolime, dolomite or other calcium and magnesium compounds. More preferably, the residual sludge should contain at least about 70% by weight of such a mixture on a dry basis. Ideally, the residual sludge should contain (on a dry basis) about 40% by weight calcium in the form of carbonate or hydroxide, and about 60% by weight magnesium in the form of magnesium hydroxide. However, with waters that contain only small amounts of magnesium, removal of magnesium from the water may not be practiced. This may result in water plant sludges containing negligible amounts of magnesium hydroxide. In this case, the sludge containing only calcium compounds can be used to produce a calcium acetate deicer. Generally, this residual sludge is provided by first taking a quantity of as is water plant sludge or slurry and separating a portion of the liquid fraction thereof to yield a residual sludge having the desired mixture of calcium and magnesium compounds therein.

In the next step, the residual sludge is treated with at least acetic acid to form a reaction product containing at least calcium acetate. Again in preferred forms, residual sludge containing appreciable quantities of both calcium and magnesium compounds is treated with a mixture of acetic and propionic acids to form a dual salt reaction product containing both CMA and CMP. The acids are provided at stoichiometric ratios depending upon the content of CMA or CMA/CMP desired in the final road deicer product. The reaction can be carried out under a variety of conditions, but generally involves merely contacting the acid(s) and the residual sludge with mixing at ambient temperatures and pressures; the reaction may be allowed to proceed overnight with mixing and heat dissipation and with provision to allow release of carbon dioxide produced as a byproduct.

The final step of the process involves recovering a road deicer product, preferably in dry form, which contains the desired calcium acetate, CMA or CMA/CMP salts. In most instances, the recovery would involve drying, grinding and granulating. In the case of a calcium acetate or CMA road deicer, the deicer product should have at least about 50% by weight calcium acetate or CMA therein, and more prerferably from about 70–100% by weight CMA. In the preferred dual salt product, the road deicer should have an excess by weight of CMP as compared with CMA, and more preferably from about 50–75% by weight CMP and from about 25–40% by weight of CMA. The final product is normally a dried and granulated flowable road deicer which can be applied in the conventional manner.

DETAILED DESCRIPTION OF THE PREFERRED EMBODIMENT

The following example describes representative processes for the production of road deicer products using water plant residual sludges. It is to be understood that the example is provided by way of illustration only, and nothing therein should be taken as a limitation upon the overall scope of the invention.

EXAMPLE

In this example, lime sludge from the primary sedimentation basin at the Manhattan, Kans. water plant was used. The as is lime slurry had a solids content of approximately 12% by weight, and contained calcium hydroxide, calcium carbonate, magnesium hydroxide, iron (III) hydroxide, aluminum hydroxide, clay particles and other impurities. It was first vacuum filtered at 25 inches of Hg to achieve a solids content of about 60% by weight. The resulting filter cake was reacted with organic acids over a period of several hours with mixing, as follows: A sludge-CMA product was produced by reacting the filter cake and acetic acid at a ratio of 0.48 grams acetic acid per gram of filter cake. A sludge-CMP product was produced by reacting the filter cake and propionic acid at a rate of 0.59 grams propionic acid per gram of filter cake. This reaction product had a calcium to magnesium molar ratio found by analysis to be 12:1. The comparative sludge-CMP/CMA product was obtained by mixing three parts CMP product with 2 parts CMA product to give the sludge-CMP/CMA product a CMP:CMA ratio of 3:2.

These two products were tested to determine their relative ice melting capacities. This test was conducted in accordance with the "Test Method for Ice Melting of Solid Deicer Chemicals" appearing in *Handbook of Test Methods for Evaluating Chemical Deicers*, published as a part of the Strategic Highway Research Program, National Research Council, Washington, D.C. (1992). This test method is incorporated by reference herein. In summary, however, the test utilizes a sheet of ice of uniform thickness (1/8") frozen in a flat circular Plexiglass dish. After equilibrium to the desired temperature, deicer particles are broadcast-spread over the ice. At specified time intervals, generated brines are decanted by tilting the specimen to the perimeter of the dish, withdrawn via a syringe, measured for volume, and reintroduced to the test specimen so the melting process can continue.

The following table sets forth the results of these ice melting tests.

| Time (Min.) | Ice Temperature (°C.) | Sludge-CMA (Brine Vol. ml/mg Deicer) | Sludge-CMP/CMA (Brine Vol. ml/mg Deicer) |
|---|---|---|---|
| 0  | −7    | 0.00  | 0.00 |
| 15 | −7    | 2.24  | 2.27 |
| 30 | −7    | 2.98  | 3.06 |
| 45 | −7    | 3.51  | 3.54 |
| 60 | −7    | 3.78  | 3.80 |
| 0  | −11.5 | 0.00  | 0.00 |
| 15 | −11.5 | 0.83  | 1.16 |
| 30 | −11.5 | 1.45  | 1.70 |
| 45 | −11.5 | 1.87  | 1.83 |
| 60 | −11.5 | 2.18  | 1.96 |
| 0  | −15   | 0.00  | 0.00 |
| 15 | −15   | 0.00  | 0.00 |
| 30 | −15   | 0.00[1] | 0.52 |
| 45 | −15   | 0.00[1] | 0.84 |
| 60 | −15   | 0.52  | 0.89 |

[1]Some melting but negligible brine volume.

As can be seen, while both the sludge-CMA and sludge-CMP/CMA products can be used for deicing, the dual salt mixture is more effective, especially at −15° C.

I claim:

1. A process for the production of a road deicer comprising the steps of:

providing a quantity of a water plant residual sludge which contains at least about 50% by weight on a dry basis of compounds selected from the group consisting of calcium carbonate, calcium hydroxide, magnesium hydroxide and mixtures thereof;

reacting said sludge with a sufficient quantity of acetic acid to form a reaction product containing acetate salts of said compounds; and recovering a road deicer product containing said acetate salts.

2. The process of claim 1, said sludge containing calcium hydroxide, calcium carbonate and magnesium hydroxide, and including the step of reacting said sludge with both acetic acid and propionic acid to form a calcium magnesium acetate/calcium magnesium propionate reaction product, and thereafter recovering a road deicer product containing amounts of both calcium magnesium acetate and calcium magnesium propionate.

3. The process of claim 2, the amount of said calcium magnesium propionate present on a weight basis in said road deicer being greater than the amount on a weight basis in said road deicer of said calcium magnesium acetate.

4. The process of claim 3, said road deicer product containing from about 50–75% by weight calcium magnesium propionate and from about 25–40% by weight of said calcium magnesium acetate.

5. The process of claim 1, said sludge containing at least about 70% by weight of said compounds.

6. The process of claim 1, including the step of first taking a quantity of starting water plant sludge as received from a water plant and containing a liquid fraction and a solids fraction and thereafter separating at least a portion of the liquid fraction of said starting water plant sludge to provide said residual sludge.

7. The process of claim 6, said water separation step comprising the step of subjecting said quantity of water plant sludge to a liquid fraction separation process selected from the group consisting of vacuum filtration, centrifugation, belt filtration, and pressure filtration.

8. The process of claim 1, said recovery step comprising the steps of drying and grinding said reaction product to form said road deicer product.

9. A road deicer product prepared by the process comprising the steps of:

provding a quantity of a water plant residual sludge which contains at least about 50% by weight on a dry basis of compounds selected from the group consisting of calcium carbonate, calcium hydroxide, magnesium hydroxide and mixtures thereof;

reacting said sludge with a sufficient quantity of acetic acid to form a reaction product containing acetate salts of said compounds; and recovering a road deicer product containing said acetate salts.

* * * * *